UNITED STATES PATENT OFFICE.

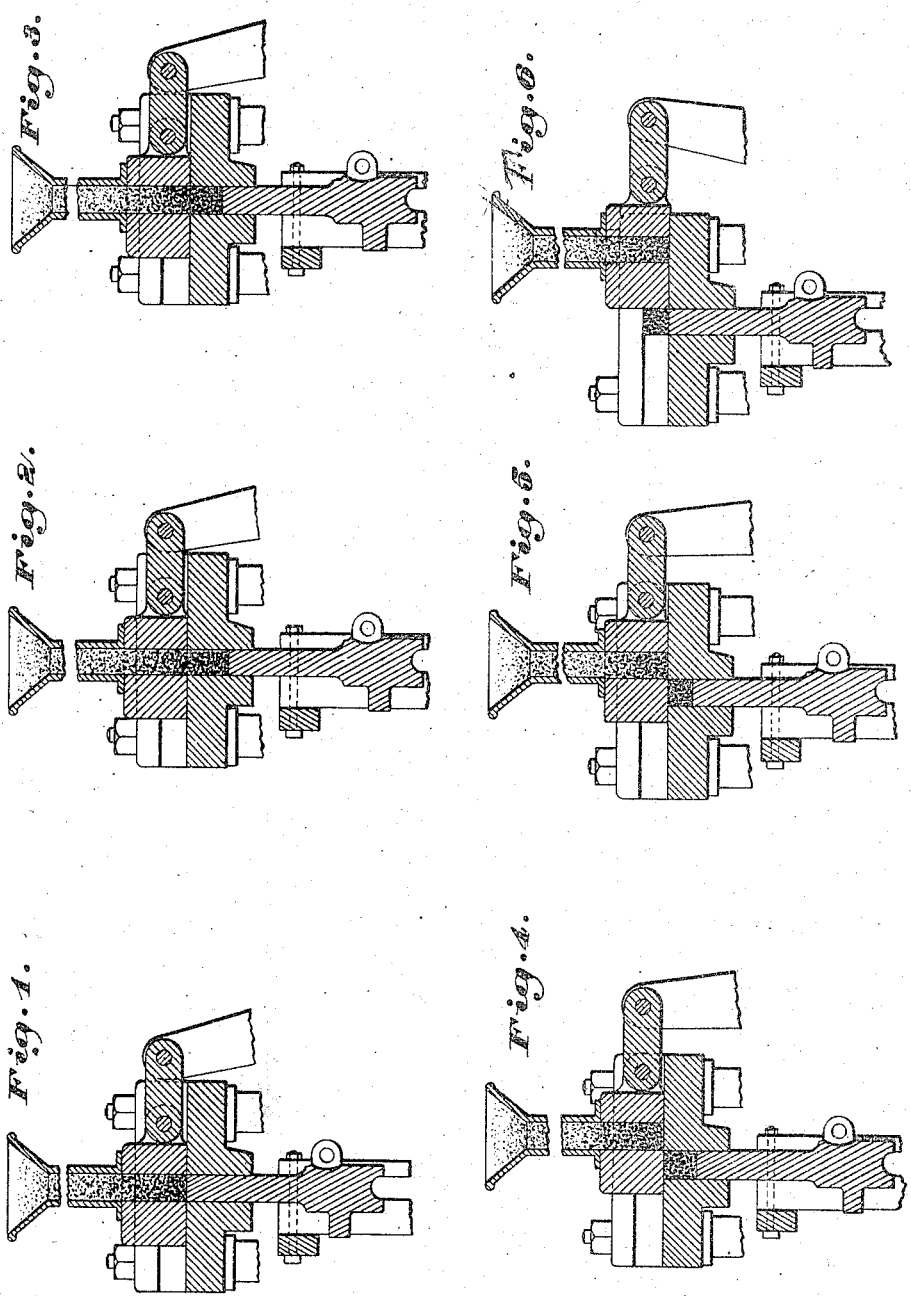

GEORGE B. UPHAM, OF BOSTON, MASSACHUSETTS.

PROCESS FOR MANUFACTURING COMPRESSED ASPHALT BLOCKS.

1,168,768.   Specification of Letters Patent.   Patented Jan. 18, 1916.

Application filed July 5, 1910. Serial No. 570,266.

*To all whom it may concern:*

Be it known that I, GEORGE B. UPHAM, a citizen of the United States, and a resident of Boston, in the county of Suffolk and State of Massachusetts, have invented an Improvement in Processes for Manufacturing Compressed Asphalt Blocks, of which the following is a specification.

This invention relates to a process for treating material in the manufacture of blocks or tiles from asphaltic or other bituminous compositions.

In order that my invention may be readily understood, I shall describe its use in connection with the usual process of manufacturing asphaltic blocks.

Compressed asphaltic paving blocks are manufactured from crushed and pulverized stone united by a bituminous binder. A formula frequently used employs between seventy-five and eighty-five per cent. of crushed rock, between five and ten per cent. of Trinidad asphalt and from ten to fifteen per cent. of pulverized limestone, commonly called fines. The crushed rock of this mixture is heated to about 350° F., the asphaltic cement to about 320° F., the ingredients are thoroughly mixed, fed to a press and are there, at a temperature of about 290° F., subjected to heavy compression in a suitable mold.

On issuing from the press such blocks are frequently more or less cracked by the expansion of air or gas trapped in the block during the compressing action. The material is fed down the elongated neck of the press in a loose or coarsely granular condition. A certain depth of this material, for instance, 4½", is allowed to fall into the mold for each block. The mold is then covered by a suitable plate and heavy pressure is applied to compress the material. When the depth of loose material is 4½" and pressure is applied, a comparatively solid block of about 3" thickness is formed. As the ingredients are practically incompressible, it is clear that the 1½" reduction in volume is caused by the expulsion of the hot air or gases from the interstices of the mixture. This expulsion is not complete however. As the plunger moves up from below it presses the mass against the plate above. Those portions of the material near the plunger and near the plate are believed to be the first to be affected by the compression. This solidifies them to some extent almost immediately and renders it difficult for the air in the center of the mass to escape through the small openings around the top and bottom edges of the mold. Most of the air escapes, but some is trapped, which, being subjected to say six thousand pounds pressure to the square inch, is tremendously reduced in volume. As soon as the pressure is removed this tends to expand and in so doing and in escaping to the surface tends to crack somewhat the structure of the block.

The drawings illustrate diagrammatically one embodiment of my new process.

Figure 1 shows relative positions of the mold, mold cover, neck and plunger, prior to filling; Fig. 2 shows the relative positions thereof after filling; Fig. 3 shows the relative positions thereof after open mold compression; Fig. 4 shows the relative positions when ready for final compressing; Fig. 5 shows the relative positions after compression; Fig. 6 shows the relative positions after the mold has been emptied.

My new process aims to decrease this tendency to crack by driving off a large percentage of the hot air or gases from the granular material prior to the application of pressure thereto in the closed mold. For this purpose I provide means whereby, after material has been allowed to fill the mold and while the mold is open to the feeding neck which is still above in communication and in register with the incomplete mold, that is to say, the mold without a cover, the lower wall or plunger of the mold is raised to compress the material in the mold from beneath against the column of material above it in the neck, thus forcing the hot air or gases upwardly in the direction in which they naturally tend to go. This column, though open at the top, offers considerable resistance to the compression of the material by reason of its weight and its frictional contact with the inner surfaces of the neck. The result of this upward pressure is to solidify to some extent the material by driving out the hot air and gases. These escape with comparative readiness, some through the slits or joints where the neck and the plunger meet the mold and some through the porous column of the material in the neck above, which receives the pressure in place of the solid plate as has been the case heretofore. The lower part of the column of material in the neck also may have some of the air driven from it when it receives the upward pressure and in such case less air remains to be expelled when it in its turn reaches the mold. Subsequently the material so treated in the mold is segregated from the column and, after the mold has been completed or covered, is subjected to one or more compressions therein, and subsequently ejected and cooled at a relatively low temperature in the usual manner preferably in water.

The thickness of the resultant block may be determined by the upward limit of the preliminary open mold compression stroke if it is desired to do so. If this stroke is regulated in such manner as to cause its upward limit to be high, a larger percentage of the material which entered the mold on the downward stroke of the plunger may be forced back into the lower portion of the neck and hence a thinner block will be formed. Conversely if the plunger stroke is regulated in such a manner as to cause its upward limit to be low in the mold, a smaller percentage or none of the material will be forced up into the neck and hence enough material will be left in the mold to form a thicker block after final compression.

It will be understood that when reference is made in the claim to opposing to such compression the resistance of the portion of the column above the mold, this resistance includes such frictional resistance as may be caused by the contact of the material of the column with the inner surface of the neck.

In the claims I have used the expression "applied compression." By this I mean pressure applied to the column of material automatically, by fluid pressure or mechanical means, as distinguished from gravity or pressure from above imparted by hand. The action of gravity is not sufficient to expel much of the air from the mass, and hand pressure, such as is sometimes imparted by sticks to force the material down the neck, has the opposite effect from that which is desired. It tends to solidify to some extent the material on the top of the column, and thereby cuts off the escape of the air from the material below. By my invention the compressive effect of the action imparted from below upon the material of the column may gradually or imperceptibly increase as the material approaches the bottom of the mold, so that such material receives more and more of the pressure, and becomes more and more compacted, while the less compacted material above remains sufficiently porous to allow the comparatively free escape of the air.

I have found that a block compressed from material treated by my process has much less tendency to crack than a block made by the ordinary process, because of the smaller quantity of air entrapped therein.

My invention is not confined to the specific manner of practising it above described.

What I claim and desire to secure by Letters Patent is:

The process of manufacturing compressed bituminous paving blocks which consists in forming a prolonged, confined column of heated bituminous material, the lower portion of said column being of substantially constant cross sectional dimensions, the lower end of said column resting in a mold; compressing from beneath the lower end of said column that is in the mold, thereby expelling entrained air through said column, while opposing to such compression the resistance of a portion of the column above the mold; dividing the column transversely, adjacent the top of the mold and covering the latter; subjecting the covered contents of the mold to final compression to produce the compressed block, and cooling the compressed block to preserve its shape.

In testimony whereof, I have signed my name to this specification, in the presence of two subscribing witnesses.

GEORGE B. UPHAM.

Witnesses:
PRESTON UPHAM,
ROBERT H. KAMMLER.